United States Patent

Faulkner et al.

[11] 4,217,637
[45] Aug. 12, 1980

[54] DATA PROCESSING UNIT WITH TWO CLOCK SPEEDS

[75] Inventors: Trevor L. Faulkner, Wilmslow; Barry M. Hall, Grantham, both of England

[73] Assignee: International Computers Limited, London, England

[21] Appl. No.: 894,852

[22] Filed: Apr. 10, 1978

[30] Foreign Application Priority Data

Apr. 20, 1977 [GB] United Kingdom ............. 16380/77

[51] Int. Cl.² ............................ G06F 1/04; G06F 9/02; G06F 5/06
[52] U.S. Cl. ..................................................... 364/200
[58] Field of Search ... 364/200 MS File, 900 MS File; 340/691

[56] References Cited

U.S. PATENT DOCUMENTS

| 3,623,017 | 11/1971 | Lowell | 364/200 |
| 3,703,707 | 11/1972 | Bovett | 364/200 |
| 3,753,232 | 8/1973 | Sporer | 364/200 |
| 3,764,992 | 10/1973 | Milne | 364/200 |
| 3,809,884 | 5/1974 | Nibby et al. | 364/200 |
| 3,950,735 | 4/1976 | Patel | 364/200 |
| 3,980,993 | 9/1976 | Bredart et al. | 364/200 |
| 3,984,812 | 10/1976 | Dahlberg et al. | 364/200 |
| 4,050,096 | 9/1977 | Bennett et al. | 364/200 |

OTHER PUBLICATIONS

*M6800 Microprocessor Application Manual*, Motorola Inc., 1975, pp. 4—48-4—61.

Primary Examiner—Gareth D. Shaw
Assistant Examiner—E. Chan
Attorney, Agent, or Firm—Hane, Roberts, Spiecens & Cohen

[57] ABSTRACT

A data processing unit in which the clock speed is selected to match the access times of the store units connected to it. This is achieved by means of a special terminal on each store unit, this terminal being internally grounded if the unit is of a slow access type, and open-circuited if the unit is of a fast access type.

2 Claims, 4 Drawing Figures

DATA PROCESSING UNIT WITH TWO CLOCK SPEEDS

INTRODUCTION

This invention relates to data processing units.

A data processing unit generally comprises a control unit, a clock unit for producing clock pulses which determine the rate of operation of the control unit, and at least one store unit. The store units may be removably connected to the control unit, so that they can readily be removed and replaced, if required.

One object of the present invention is to provide a data processing unit which can readily be modified for operation at different speeds.

SUMMARY OF THE INVENTION

According to the present invention, a data processing unit comprises:

(a) a control unit, (b) a clock unit for producing clock pulses which are fed to the control unit to determine the rate of operation of the control unit, and (c) at least one store unit which is removably connected to and accessible by the control unit, wherein the or each store unit has indicating means producing an indication of the access time of the store unit, and wherein the clock unit is arranged to control the rate of production of the clock pulses in accordance with the value of the indication from the or each store unit, thereby ensuring that the rate of production of clock pulses matches the access time of the store unit or units.

BRIEF DESCRIPTION OF THE DRAWINGS

One embodiment of the invention will now be described, by way of example, with reference to the accompanying drawings, of which

DESCRIPTION OF SYSTEM

Figure 1:
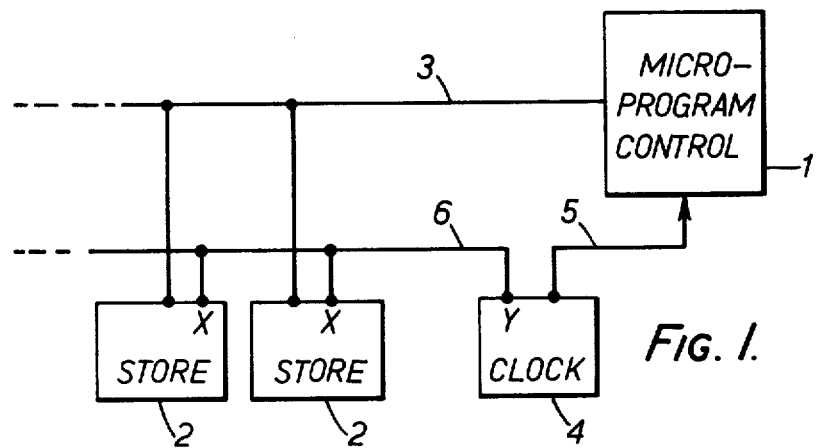
FIG. 1 shows a data processing system.

Referring to FIG. 1, the system comprises a microprogram control unit and a plurality of control store units. Each of the store units 2 may, for example, consist of a printed circuit card carrying the plurality of integrated circuit memory components. These cards are plugged in to a conventional circuit assembly (not shown) of the "bookshelf" type, each card being readily removable and replaceable.

In operation, the control unit 1 fetches sequences of micro-instructions from the store units 2 over a path 3, and decodes and executes each micro-instruction in turn. The rate at which the micro-instructions are fetched and executed is controlled by a clock unit 4 which issues clock pulses to the control unit 1 over a line.

Each store unit 2 may be of either of two different types. The first type is a relatively slow, cheap unit having an access cycle time of 300 nanoseconds. The second type is a relatively more expensive unit with a faster cycle time of 150 nanoseconds.

Each store unit has a terminal X and, as shown in FIG. 1, all the terminals X are linked together by a line 6 and connected to terminal Y on the clock unit 4.

Figure 2:
FIGS. 2 and 3 show the way in which the access speeds of store units are indicated.

Referring to FIG. 2, in the slower version of the store unit, the terminal X is connected internally to a potential of zero volts. Referring to FIG. 5, in the faster version the terminal X is open circuited. Thus, terminal X provides a means for electrically identifying whether the store unit is a fast or a slow unit.

Figure 3:
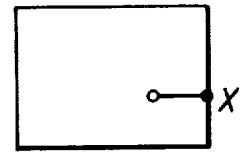
Figure 4:
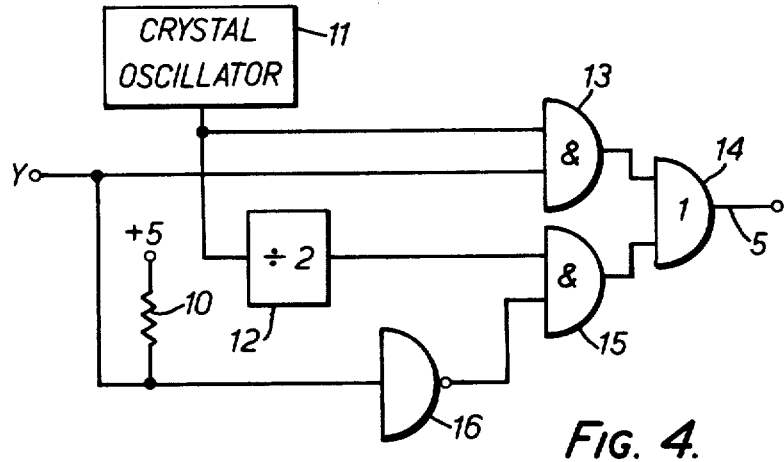
FIG. 4 shows the clock unit of the system.

Referring to FIG. 4, the terminal Y in the clock unit is connected through a pull-up resistor 10 to a +5 volt supply. Thus, if all the storage units are of the faster type (FIG. 3) the terminal Y will be nearly at 5 volts, but if any of the units is of the slower type (FIG. 2) the terminal Y will be held down to zero volts.

The clock unit includes a crystal oscillator 11 which produces a pulse every 150 nanoseconds. These pulses are applied to a divide-by-two bistable 12 to produce a second, slower train of pulses at a rate of one every 300 nanoseconds.

The signal on terminal Y controls the selection of either the faster or slow pulses as the clock signal for feeding to the control unit. If terminal Y is at 0 volts, an AND gate 15 is enabled (by means of an inverter 16), and this allows the slow pulses from the bistable 12 to pass through the AND gate 15, and through the OR gate 14 on to the line 5.

Thus, it can be seen that the clock pulse rate is automatically adjusted to correspond to the access cycle times of the storage units. The advantage of this is that the processing unit may be initially sold to a customer with the slower, cheaper store units. If at some later time the customer wishes to upgrade his system, he can replace the slow units by the faster, more expensive store units, and the clock speed will automatically be increased to take account of this.

We claim:

1. A data processing system comprising:
(a) a control unit
(b) a plurality of store units each of which is of either a first type of relatively fast access speed or second type of relatively slow access speed, each of the store units being removably connected to and accessible by the control unit,
(c) each store unit having indicating means forming an integral part thereof and providing an indication having a first value in the case where the store unit is of said first type and a second value in the case where the store unit is of said second type
(d) means for combining the indications from the store units to produce a control signal which has a first level if all said indications have said first value and a second level if any one of said indications has said second value, and
(e) a clock unit responsive to said control signal for producing clock pulses at a rate corresponding to the access speed of store units of the first type when the control signal has said first level, and producing clock pulses at a rate corresponding to the access speed of store units of the second type when the control signal has said second level.

2. A data processing system according to claim 1 wherein said indicating means of each store unit comprises an electrical terminal, which is connected to ground potential internally of the store unit or is open circuited, depending on whether the store unit is of said first or second type.

* * * * *